United States Patent [19]

Bonifacino

[11] Patent Number: 4,768,425

[45] Date of Patent: Sep. 6, 1988

[54] DEVICE FOR EXTRACTING A SUGAR MASS FROM A VACUUM COOKER

[75] Inventor: Mario Bonifacino, Acqui Terme, Italy

[73] Assignee: Carle & Monanari S.p.A., Italy

[21] Appl. No.: 916,198

[22] Filed: Oct. 7, 1986

[30] Foreign Application Priority Data

Oct. 18, 1985 [IT] Italy .............................. 22546 A/85

[51] Int. Cl.⁴ .............................................. A23N 1/00
[52] U.S. Cl. ...................................... 99/352; 99/511; 127/19
[58] Field of Search ................. 99/352, 355, 511, 512, 99/302 C, 450.1; 209/915; 127/19, 43

[56] References Cited

U.S. PATENT DOCUMENTS

| | | | |
|---|---|---|---|
| 3,301,708 | 1/1967 | Rötel | 127/19 |
| 4,052,304 | 10/1977 | Vertenstein | 127/19 X |
| 4,063,959 | 12/1977 | Dietzel et al. | 127/19 |
| 4,205,999 | 6/1980 | Zeichner et al. | 127/19 |
| 4,409,031 | 10/1983 | Schaper | 127/19 |
| 4,412,865 | 11/1983 | Schmidt | 127/19 |
| 4,443,266 | 4/1984 | Schaper et al. | 127/19 |
| 4,506,601 | 3/1985 | Ramirez et al. | 99/511 |

*Primary Examiner*—Louis K. Rimrodt
*Assistant Examiner*—J. L. Olds
*Attorney, Agent, or Firm*—Kirschstein, Kirschstein, Ottinger & Israel

[57] ABSTRACT

A device for extracting a sugar mass from a vacuum cooker, comprising a centrifugal turbine-like rotor equipped with a limited number of blades for the extraction of the sugar mass, said rotor being placed in a housing which may be connected to said cooker and whereon an outer cavity is provided for the introduction of a heating fluid. The sugar mass drops directly into the scroll of the centrifugal rotor, where it is conveyed, under a slight pressure, through a peripheral conduit leading into a tangential outlet duct.

9 Claims, 2 Drawing Sheets

DEVICE FOR EXTRACTING A SUGAR MASS FROM A VACUUM COOKER

BACKGROUND OF THE INVENTION

This invention relates to a device for extracting a sugar mass from a vacuum cooker.

Vacuum sugar mass cookers are chiefly used for the production of sugar masses with which boiled sweets, bonbons and sugar drops are manufactured. It is readily apparent that the formulation, or viscosity, of the sugar masses may vary, depending on the different types of sugar-drops and the like that are produced. But whatever the case, the sugar-drops will keep only if the water content present in the end product, i.e. the sugar mass after processing, is extremely low. In order to meet this requirement, the sugar mass is normally vacuum-processed in accordance with a known procedure. Moreover, an effort should be made to prevent crystallization when extracting the sugar mass.

German Pat. No. 820,843 and French Pat. No. 1,366,806 relate to devices specifically designed to treat the sugar masses, said devices comprising a gear pump, whereby in said French patent the gears of the pump are so designed as to run hot during operation. Such devices are unsuitable for extracting vacuum-processed sugar masses, for the mechanical stresses caused by the gears are transmitted to the sugar mass and result in the crystallization thereof. An additional drawback is inherent in those devices which feature heatable gears, as the sugar mass is likely to stick to the gears themselves, especially where considerably high temperature values are attained.

Also the conventional manual extracting method, whereby the crystalline mass is removed in batches by means of trays, presents several shortcomings, including the high number of labourers required, the need to perform the operation at a given work pace, having to introduce the batches into the sweet-manufacturing machine, etc.

Extraction devices featuring conveyor scrolls are also known, for example by German utility model Pat. No. 1,946,227 and by German laid open patent application DE-AS No. 2,121,378, in both of which a conveyor scroll or screw feeder is provided in order to convey the sugar mass from the vacuum cooker to the inlet of the manufacturing machine downstream thereof. In the aforementioned German utility model No. 1,946,227, both the scroll and its housing are cone-shaped along their entire length, while in said German application DE-AS No. 2,121,378, only the outlet section of the scroll, and of the relevant housing, is cone-shaped. This entails a relatively long conveyance path, which in turn implies considerable costs as suitable devices are needed in order to maintain the desired temperature level across the entire path, an additional drawback being that particular procedures must be worked out for sugar masses having different viscosity degrees. Moreover, the considerable friction caused by mechanical displacement, e.g. thrusting, along a relatively long path increases the likelihood of crystallization in the mass which is undergoing treatment.

In addition to the above, German Pat. No. 1,270,939 discloses a sugar mass-extracting device comprising either a couple of extractor rollers or a single such roller, said roller/s co-operating with some special scrapers and thus extracting the sugar mass through its adhesion to said roller/s, conveyance being effected by rotation and delivery through the aforementioned scrapers or through the interaction of the two extractor rollers. An adjustable opening produced in the bottom of the device is designed to let the sugar mass initially fall by gravity onto an underlying conveyor belt. The design features hollow roller shafts for conduction of a heating liquid. The principle underlying these devices is no doubt interesting; all of said devices, however, require the adoption of conveyor belts for the transfer of the extracted mass, for extraction occurs, essentially, by gravity, hence the devices are unable to apply suitable pressure to the sugar mass so as to convey it along an internal path leading to the sweet-processing machine.

A further shortcoming of these devices lies in the difficulty to heat the sugar mass conveyance path so as to maintain the desired temperature. Yet another drawback inherent in this kind of device is that it requires an independent sugar conveyance path, namely one which cannot be designed as an integral part of a self-contained unit.

The effectiveness of this kind of device is further impaired by wear, as resulting from functional contact between the operating members, i.e. between one roller and the other and between said rollers and the scrapers, the abrasive action of the processed sugar mass being utlimately responsible for such wear. Worn functional members may result in heavy losses, as their replacement may imply a considerable amount of idle time for the entire production plant—in some instances, several days running. This may lead to rather serious consequences, as the average output of each such plant is e.g. 1,000 kgs/hour.

SUMMARY OF THE INVENTION

The main object of this invention is to provide an extracting device of the aforementioned type, which is capable of discharging the extracted sugar mass continuously while maintaining the desired vacuum conditions upstream of the cooker and which offers the possibility of extracting sugar masses having different degrees of viscosity in the most effective of ways, the device being based on an extremely simple constructive concept, requiring a limited amount of space and so designed as to cut replacement and/or maintenance time to a minimum.

A further object of this invention is to provide a device of the aforementioned type, comprising an extremely simple heating system and an effective cleaning circuit for removing any residual sugar mass from the inner operating members after processing.

These objects are achieved, according to the present invention, with a device of the aforementioned type, comprising a casing which may be connected to the outlet port of the vacuum cooker, and a sugar mass-extracting means housed in said casing which latter is provided with an outer interspace connected to a heating fluid source, wherein said sugar-extracting means consists of a driven centrifugal rotor placed in a scroll-like chamber in said casing between the outlet of the vacuum cooker and a delivery or discharge duct.

According to the invention, the centrifugal rotor is provided with a limited number of blades, preferably two in number, said blades being so shaped as to develop peripherally a considerable curvilinear profile.

The blades of said rotor are designed in the form of a dual inclined plane, that is decreasing both outwardly in a radial direction and laterally in a peripheral direction, i.e. the direction of rotation.

According to the invention, the width of the angle defined by the curvature of the blades is included in a range of 10° to 20°, and is preferably of 15°.

Both the bladeless side of the rotor and the far ends of the blades are designed with projecting profiles, said profiled sections being housed in corresponding housings provided in the body, i.e. casing of the device.

The centrifugal rotor casing is advantageously designed as an integral part of the body of the extracting device, and the side thereof facing the bladeless side of the rotor defines a cleaning chamber, as well as a supporting sleeve which houses the rotor-driving shaft and is so designed as to form, along with said shaft, two chambers for housing seal rings or packings.

Moreover, according to the invention, the device features a branch pipe leading into the rotor-housing chamber, said pipe being designed for the introduction into said chamber either of a washing fluid or of aromatic compounds, dyes and the like, to be added to the sugar mass prior to its delivery.

A further advantage of said device lies in the fact that the device proper and its driving members form a self-contained, i.e. independent unit.

Although the specific gravity of the sugar masses processed in the vacuum cooker is approximately 1.5 and the value of the vacuum reached within such cookers approximates 70 cm of Hg, i.e. almost 1 bar, and although the main parameters adopted for the extraction of the sugar mass are minimum rates of flow and maximum head values, with the device according to the invention excellent results may be obtained by conveying the extracted sugar mass through such means as a centrifugal rotor or a centrifugal pump, namely through devices whose functional parameters are universally known to be quite the opposite, i.e. devices which are particularly suited to operate in conditions where extremely high rates of flow and extremely low head values are required. The centrifugal rotors or turbines suggested in accordance with this invention are equipped with a very small number of blades, whereas centrifugal pumps commonly adopted for water as well as for thick liquids feature multi-blade rotors, e.g. carrying 20 to 25 blades, the profiles of such blades being furthermore substantially rectilinear. On the other hand, according to the invention, the blades feature a considerably large circumferential extension and a curvilinear profile. This design, along with the definition of a suitable outlet angle to be selected between 10° and 20°, preferably with a value of 15°, offers an important advantage in that the sugar mass can be conveyed slowly through the device and be ejected therefrom with a slight pressure. It was equally surprising to find out that, by using centrifugal pumps of the aforementioned type featuring two blades only and by maintaining a virtually constant speed of rotation, delivery was nonetheless characterized by a high degree of "flexibility", namely ranged from a minimum rate of flow of 200 kgs/hour to a maximum rate of flow of 2,000 kgs/hour, depending on the relative aperture of the delivery port of the centrifugal pump. The adjustment of said port is desirably effected by means of a simple adjustable-stroke gate valve, or the like.

The extracting device developed in accordance with this inventive concept offers many advantages, including the following:

The construction is very simple and includes an extremely limited number of components; its relatively low cost as compared with the costs involved in the stoppage of a production plant would, therefore, suggest keeping on site a spare device of the kind as a feasable, effective solution.

The overall dimensions of the device are very small, hence the amount of space required for its installation is also extremely limited. This means that the extracting device may be installed in any given production plant in accordance with specific requirements. This, in turn, entails a significant reduction in the length of the sugar mass conveyance path leading from the vacuum cooker to the sweet-manufacturing machine located downstream thereof.

The extracting device and its driving and speed-governing assemblies form a self-contained independent unit, which is both simple and quick to install in any given production plant.

The time required for turbine maintenance or replacement is extremely limited—approximately 20 mins.

The device is designed in such a way that it may be fitted also on pre-existent cookers.

The device features a simplified structural arrangement of the hollow spaces designed to contain the heating fluid as well as a washing circuit to be operated at the end of the processing cycle.

The device features an inlet port for the introduction of aromatics, dyes and the like, which are to be added to the sugar mass prior to its delivery.

BRIEF DESCRIPTION OF THE DRAWINGS

Further features, advantages and details of the extracting device according to the invention will become apparent from the following description of a preferred embodiment therof, to be considered in conjunction with the enclosed drawings, wherein.

DETAILED DESCRIPTION OF THE PREFERRED EMBODIMENT

Figure 3:
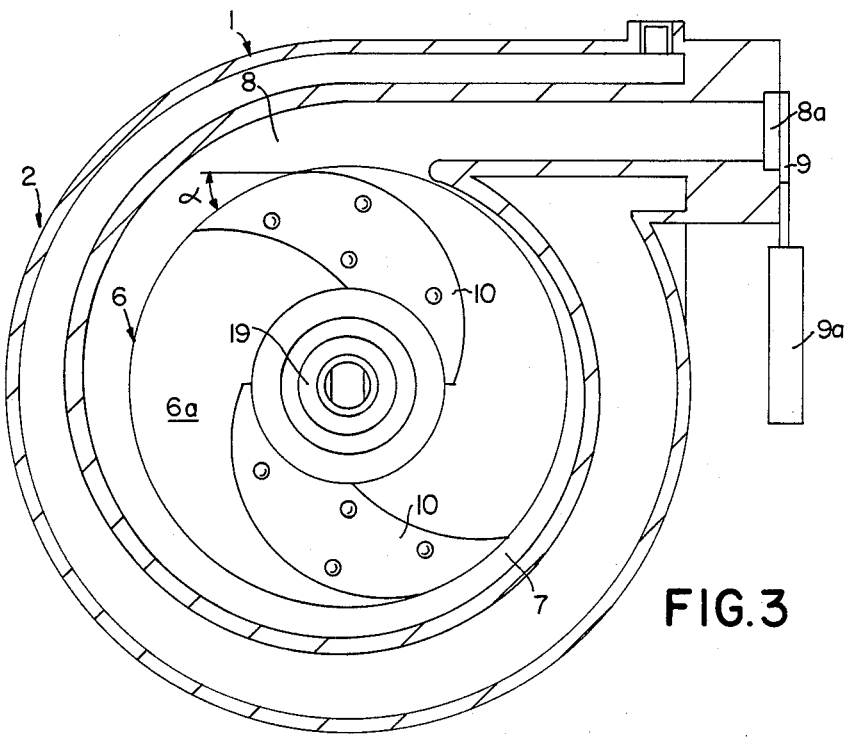
FIG. 3 is a cross-sectional view of the device according to a composite path III—III of FIG. 2 in order to show the position of the rotor according to the invention within the relative scroll-like chamber.
Figure 1:
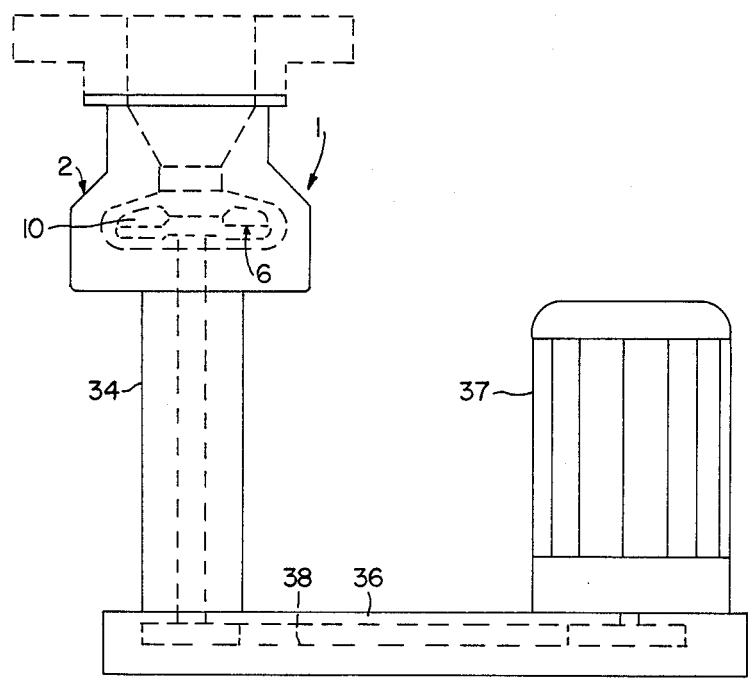
FIG. 1 is an overall view of the extracting device according to the invention.

In the figures referred to hereabove, wherein like components are marked by like numeral references, the extracting device according to the invention is indicated, as a whole, at 1. Said device comprises a body or casing 2, the upper portion whereof is provided with a flange 3 designed to connect said casing—by means of not shown screws—to the bottom end of the sugar mass vacuum cooker, which is illustrated schematically though a dotted line. The upper portion of an internal feedbox marked 4 features a port 4a which, when properly assembled, leads directly into a delivery or outlet port of the vacuum cooker, whereas its bottom portion features a port 4b which leads into an inlet port 5a of the scroll-like chamber 5, which houses a sugar-extracting unit in the form of a centrifugal rotor 6 and defines a winding peripheral channel or duct 7 which, in turn, forms a tangential outlet channel or duct 8 through which the processed sugar mass is delivered. The port 8a of said duct 8 is directly connectable to the inlet port of the sweet-manufacturing machine located downstream of the device (not shown herein), whereby a gate valve 9 driven by a relevant control unit 9a is specially provided in order to adjust the cross-section of said port 8a, or close it altogether, depending on one's specific requirements. In this particular illustration, rotor 6 comprises a disk-shaped member 6a carrying, on its side facing feedbox 4, a limited number of blades 10, only two such blades being shown in the illustrated embodiment.

Figure 2:
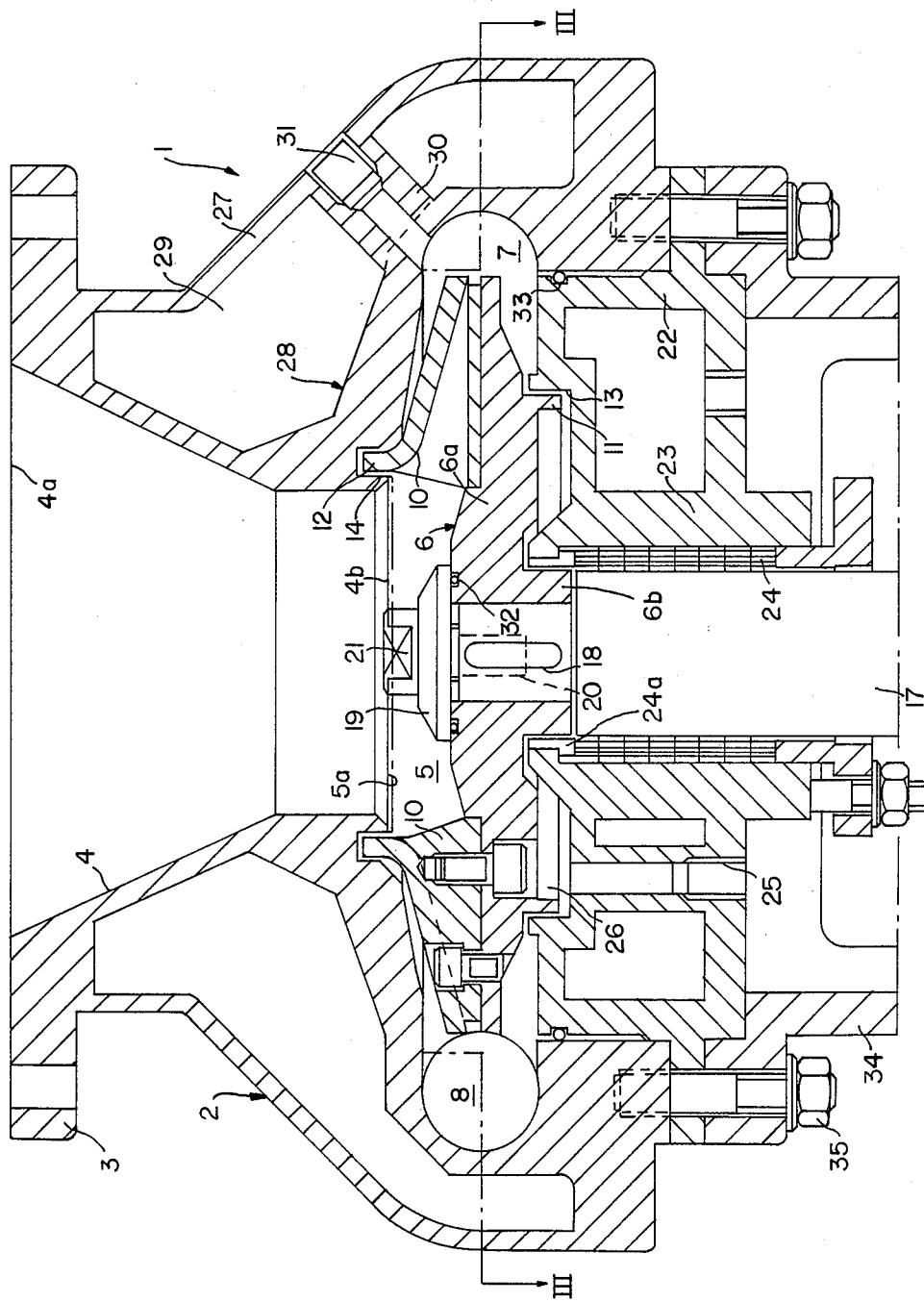
FIG. 2 is a large-scale representation of the upper part of said device, comprising the centrifugal pump and, more specifically, a view thereof according to a median vertical section.

FIG. 3 readily shows that blades 10 feature a considerably large peripheral extension and a curvilinear profile and are, furthermore, designed in the shape of a dual inclined plane, that is, decreasing both in the radial and in the peripheral directions. As shown in FIG. 2 both the bottom end of the disk-shaped member 6a and the far ends of the blades 10 respectively feature projecting profiles 11, 12, said profiled ends being housed in slots 13 and 14, respectively.

Rotor 6 is driven by a drive shaft 17, the two members being connected to each other in a conventional way, e.g. a gib-and-key connection, referred to as 18. A positioning disk marked 19 is provided with a threaded pin 20, which is housed in a corresponding threaded port located at one end of shaft 17, as well as with a slot 21 designed to receive a not shown tightening wrench. Casing 2 features a bottom portion 22 wherein the aforementioned slot 13 is produced, same comprising a sleeve marked 23, which, during assembly, is fitted onto the end of shaft 17, a conventional bush-like gasket or gland 24 being interposed between the above two members. A branch pipe 25, which may be connected to a not shown cleaning fluid source, e.g. water, leads into chamber 26, which is defined by the bottom end of rotor 6 and the aforementioned bottom portion 22. The numeral 24a refers to a gasket placed between the sleeve 23 and the hub 6b of the rotor 6.

An interspace 29, designed to contain a heating fluid—desirably steam—and supplied with suitable inlet and outlet pipes (not shown in the drawings) is located between the outer wall 27 of casing 2 and the feedbox unit 4, or the extension of the latter generically referred to as 28 and defining the upper part of the pump casing of the rotor 6. With reference to FIG. 2 a connection block 30 is located between the outer wall 27 and section 28 of the casing, said connection block housing a branch pipe 31, designed to convey aromatics, dyes etc. or, at the end of the processing cycle, a washing fluid, i.e. water, into the peripheral duct 7. Two gaskets, preferably of the O-ring type, are marked 32 and 33 respectively.

The casing 2 of the device according to the invention is supported by the upper end of a supporting column 34, e.g. by means of bolts 35. Said column houses the aforementioned driving shaft 17 as well as its relevant supporting members (e.g. rolling bearings, lubricated components and the like), and is itself designed to rest on a bedplate 36, which also supports the geared driving unit 37. Numeral 38 refers to a drive chain connecting the outlet pulley of said unit 37 at one end to the shaft 17 at the other end.

For the sake of simplicity, no detailed description of the known heating and washing circuits is provided herein, as the latter can be mounted without difficulty by anyone who is skilled in the field.

The operation of the device can readily be inferred from the above structural description. The sugar mass delivered by the vacuum cooker drops, under its own weight, into the chamber 5 of the rotor 6, and is hence conveyed up to port 8a, previously closed by gate valve 9.

At this stage, port 8a opens, and the rotation of rotor results in the extraction, or conveyance, of the sugar mass through a slight pressure. The width of the selected outlet angle α—preferably 15°—and the curvilinear profile of the blades 10 are, as noted earlier, important factors in ensuring the effective operation of the device.

Variations in the required rate of flow, e.g. from 2,000 down to 200 kgs/hours, can easily be obtained by adjusting the width of the delivery port, while maintaining the speed virtually constant. The above description readily shows that the device according the present invention is effective in achieving the aforementioned objects and offers the advantages referred to in the introductory part of this specification.

In the practical application of this inventive concept, a number of alterations and variations may be introduced—such as changing the shape of the blades, or their number, or modifying other geometrical features of the device—and so on insofar as they come within the scope of the appended claims or the equivalent thereof. Both the size of the device and the materials used for its construction may be chosen in accordance with one's specific requirements.

What is claimed is:

1. A device for conveying a sugar mass having certain viscosity, water content and temperature parameters from a vacuum cooker to a machine for manufacturing sweets while resisting changing of said parameters and while resisting crystallization of the sugar mass, comprising:
   (a) a casing having an internal casing wall bounding an internal chamber, an inlet connectable to a vacuum cooker for admitting a vacuum-cooked sugar mass from the cooker to the chamber, and an outlet connectable to a machine for manufacturing sweets for discharging the vacuum-cooked sugar mass from the chamber to the machine;
   (b) a rotor mounted in the chamber for rotation in a direction about an axis, said rotor having a circular peripheral wall bounding with the internal casing wall a curved peripheral path which increases in cross-section in the direction of rotation;
   (c) said casing having additional internal duct walls bounding a tangential path which communicates with and extends tangentially of the curved peripheral path;
   (d) conveyor blades mounted on the rotor for joint rotation therewith, each blade extending outwardly along a curved path up to the circular peripheral wall of the rotor, each blade having an outer curved tip which extends at least partly along the circular peripheral wall of the rotor;
   (e) drive means operatively connected to the rotor, for rotating the conveyor blades and pushing the vacuum-cooked sugar mass in the chamber in a flow into and along the curved peripheral path and the tangential path to the outlet in a manner resisting crystallization of the sugar mass and changing of said parameters of the sugar mass; and
   (f) gate means at the outlet for adjusting the flow of the sugar mass exiting the tangential path to the machine for manufacturing sweets.

2. The device as recited in claim 1; and further comprising means for heating the mass during its flow along the peripheral and tangential paths, including wall means within the casing for bounding an internal space at least partly surrounding the chamber, and into which space a heated fluid is introduced.

3. The device as recited in claim 1; and further comprising means for introducing a substance into the chamber.

4. The device as recited in claim 3, wherein said substance is a cleaning fluid for cleaning the chamber.

5. The device as recited in claim 1, wherein the casing has upper and lower portions detachably interconnected for ease of cleaning and maintenance.

6. The device as recited in claim 5, wherein two blades are mirror symmetrically arranged on the rotor, each blade outwardly decreasing in cross-section in a direction away from the axis, and each blade decreasing in cross-section in the direction of rotation.

7. The device as recited in claim 1, wherein the blade tip defines an angle of curvature with respect to a tangent of the circular periphery of the rotor.

8. The device as recited in claim 6, wherein the upper and lower portions each have annular slots, and wherein each blade has an upwardly directed projection which extends into and slides along the slot of the upper portion during rotation, and wherein the rotor has a downwardly directed projection which extends into and slides along the slot of the lower portion during rotation.

9. The device as recited in claim 1, wherein the drive means includes a motor, a drive shaft extending along the axis and on which the rotor is mounted, and a force-transmitting transmission between the motor and the drive shaft.

* * * * *